United States Patent
Graute et al.

(10) Patent No.: US 10,100,558 B2
(45) Date of Patent: Oct. 16, 2018

(54) LOCKING AID DRIVE FOR A MOTOR VEHICLE LOCK

(71) Applicant: Brose Schliesssysteme GmbH & Co. KG, Wuppertal (DE)

(72) Inventors: Ludger Graute, Essen (DE); Oleg Simkin, Cologne (DE); Axel Bettin, Hattingen (DE); Axel Kamberg, Kerpen (DE)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 119 days.

(21) Appl. No.: 14/973,420

(22) Filed: Dec. 17, 2015

(65) Prior Publication Data

US 2016/0177602 A1 Jun. 23, 2016

(30) Foreign Application Priority Data

Dec. 18, 2014 (DE) ..................... 20 2014 106 158 U (51) Int. Cl.
*F16C 1/16* (2006.01)
*E05B 79/20* (2014.01)
(Continued)

(52) U.S. Cl.
CPC .............. *E05B 79/20* (2013.01); *E05B 79/02* (2013.01); *E05B 81/06* (2013.01); *E05B 81/20* (2013.01);
(Continued)

(58) Field of Classification Search
CPC .......... E05B 79/02; E05B 79/20; E05B 81/06; E05B 81/20; E05B 81/32; F16C 1/101;
(Continued)

(56) References Cited

U.S. PATENT DOCUMENTS 3,513,719 A * 5/1970 Tschanz ................. F16C 1/226
464/173
6,676,556 B2 1/2004 Ishihara et al.
(Continued)

FOREIGN PATENT DOCUMENTS

DE 1931732 A1 * 1/1970 ............. F16C 1/226
DE 202010011541 U1 * 11/2011 ............. E05B 81/14
(Continued)

OTHER PUBLICATIONS

Machine translation of DE 202012004789 U1 obtained on Sep. 12, 2017.*
(Continued)

*Primary Examiner* — Adam D Rogers
(74) *Attorney, Agent, or Firm* — Pauly, DeVries Smith & Deffner LLC (57) ABSTRACT

The invention relates to a locking aid drive for a motor vehicle lock, with a drive housing, the locking aid drive being coupleable in terms of drive to the motor vehicle lock via a Bowden cable with Bowden cable core and Bowden cable sheath, and a driving motor with a downstream feed mechanism for producing driving movements and a coupling element for transferring the driving movements being provided. It is proposed that the coupling element can be brought, in particular by means of the drive motor, into at least one coupling position in which said coupling element is accessible from the outside for the production of a coupling of the Bowden cable to the coupling element, and otherwise is inaccessible from the outside for the production of a coupling of the Bowden cable to the coupling element.

18 Claims, 4 Drawing Sheets

(51) Int. Cl.
*E05B 81/20* (2014.01)
*E05B 79/02* (2014.01)
*E05B 81/04* (2014.01)
*E05B 81/32* (2014.01)
*F16C 1/10* (2006.01)
*E05B 81/06* (2014.01)
*F16H 25/20* (2006.01)

(52) U.S. Cl.
CPC .............. *E05B 81/32* (2013.01); *F16C 1/16* (2013.01); *F16H 25/20* (2013.01); *F16C 1/101* (2013.01); *F16C 2350/52* (2013.01)

(58) Field of Classification Search
CPC ...... F16C 1/12; F16C 1/14; F16C 1/16; F16C 2350/52; F16H 25/20; F16D 2125/60; F16D 2125/62
See application file for complete search history.

(56) References Cited

U.S. PATENT DOCUMENTS

| | | | | |
|---|---|---|---|---|
| 8,528,948 | B2* | 9/2013 | Bettin | E05B 81/20 292/201 |
| 8,864,193 | B2* | 10/2014 | Mori | E05B 79/20 292/336.3 |
| 2009/0249844 | A1* | 10/2009 | Kinnucan | E05B 47/026 70/237 |
| 2015/0197966 | A1* | 7/2015 | Regnault | E05B 77/04 292/200 |
| 2016/0002960 | A1* | 1/2016 | Faitl | F16C 1/145 292/141 |

FOREIGN PATENT DOCUMENTS

| | | |
|---|---|---|
| DE | 102011108364 | 1/2013 |
| DE | 202012004789 | 10/2013 |
| DE | 202012102522 | 12/2013 |
| DE | 102013108718 | 2/2015 |
| DE | 102015106834 | 12/2015 |
| EP | 0444780 | 9/1991 |
| JP | S6255719 | 4/1987 |

OTHER PUBLICATIONS

European Search Report for European Patent Application No. 15200647.4, corresponding to U.S. Appl. No. 14/973,420, dated May 27, 2016 (8 pages).
German Search Report for Priority Application No. DE102017108345.6 dated Apr. 12, 2018 (7 pages).
German Search Report for Priority Application No. DE202014106158.3 dated Nov. 18, 2015 (5 pages).

* cited by examiner

LOCKING AID DRIVE FOR A MOTOR VEHICLE LOCK

CLAIM OF PRIORITY

This application claims the benefit of German Utility Model No. DE 20 2014 106 158.4, filed Dec. 18, 2014, the disclosure of which is incorporated by reference herein in its entirety.

FIELD OF THE TECHNOLOGY

The application relates to a locking aid drive for a motor vehicle lock and to a method for producing a locking aid drive.

BACKGROUND

As used herein, the term "motor vehicle lock" includes all types of door locks, hood locks, lid locks or flap locks.

The known locking aid drive (DE 20 2012 004 789 U1), on which the invention is based, is assigned to a motor vehicle lock and is coupled in terms of drive thereto via a Bowden cable. The locking aid drive serves here for the motorized adjustment of the lock latch of the motor vehicle lock from a pre-locking position into a main locking position. For the production of driving movements, the known locking aid drive is provided with a drive motor and a feed mechanism connected downstream of the drive motor. The spindle is fixedly connected via a coupling element to a Bowden cable drum of the Bowden cable, and therefore the locking aid drive is always commissioned and fitted together with the Bowden cable.

A disadvantage of the known locking aid drive is that the commissioning of the locking aid drive together with the Bowden cable is complicated, in particular in respect of storage and transport. Furthermore, during the installation on the motor vehicle door or the like, care has to be taken to ensure that the Bowden cable is not rotated about the longitudinal extent thereof, in order not to allow undesirable mechanical torsional stresses to occur in the Bowden cable. Such mechanical torsional stresses make the installation more difficult and may have an adverse affect on the operation of the locking aid drive. In very general terms, a complicated handling of the known locking aid drive within the scope of the manufacturing of the motor vehicle therefore arises.

SUMMARY

Aspects of this disclosure relate to the problem of refining and developing the known locking aid drive in such a manner that the handling within the scope of the manufacturing of the motor vehicle is simplified. This problem is solved in the case of a locking aid drive as described herein.

A substantial aspect is the fundamental consideration that the possibility of simple installation of the Bowden cable on the locking aid drive, which can take place only within the scope of the manufacturing of the motor vehicle, leads to the transport and the storage of the locking aid drive being simplified. Furthermore, it has been recognized that the installation of the Bowden cable only within the scope of the manufacturing of the motor vehicle may afford a simplification of the installation itself.

Specifically, it is proposed that the coupling element can be brought into at least one coupling position in which said coupling element is accessible from the outside for the production of a coupling of the Bowden cable to the coupling element. Otherwise, the intention is for the coupling element to be inaccessible from the outside for the production of such a coupling.

The term "from the outside" means that the coupling element is correspondingly accessible or inaccessible from outside the drive housing for the installation of the Bowden cable.

With the solution according to the proposal, the locking aid drive can be brought by the adjustment of the coupling element as it were into an installation state in which the installation of the Bowden cable is possible. In view of the fact that the coupling element can be brought into the at least one coupling position such as by means of the drive motor, the above installation state can easily be adjusted by motor. Given a suitable configuration, the coupling between the Bowden cable and the coupling element, which coupling is still releasable in the coupling position, can be transferred into a non-releasable coupling by a corresponding, in particular motorized, adjustment of the coupling element being undertaken. This is also explained further below.

In an embodiment, the coupling element can be adjusted within an operating movement range during a locking aid operation. In some cases the coupling position lies outside the operating movement range. The coupling position is therefore not approached at any time during use of the locking aid drive as per normal operation, and therefore there is also no risk of an undesirable removal of the Bowden cable.

In an embodiment, although a certain form-fitting connection is provided between the coupling element and a core end piece of the Bowden cable core of the Bowden cable for the transmission of the driving movements to the Bowden cable, said form-fitting connection permits a rotational movement between coupling element and core end piece about the longitudinal extent of the Bowden cable. By means of this rotatability of the Bowden cable core as a whole, mechanical torsional stresses which make the installation of the Bowden cable more difficult and may impair the operation of the locking aid drive are avoided within the Bowden cable.

In an embodiment, a release of the form-fitting connection between core end piece and coupling element is possible only in the at least one coupling position. As soon as the coupling element is in the operating movement range, the release of the form-fitting connection is blocked. Additional locking elements, in particular clips or the like, for securing the core end piece on the coupling element can therefore be dispensed with. The above blocking of the core end piece on the coupling element can be brought about in a simple manner by corresponding activation of the drive motor.

In various embodiments, the feed mechanism for producing driving movements is a spindle/spindle nut mechanism. In some cases, the spindle of the spindle/spindle nut mechanism is longitudinally displaceable with respect to the geometrical spindle axis, but is non-rotatable in relation to the drive housing. The non-rotatable arrangement of the spindle is produced either by the non-rotatable engagement of the spindle end piece with the drive housing or by the non-rotatable engagement of the spindle end piece with the coupling element, which, in turn, is in engagement non-rotatably with the drive housing. The first-mentioned variant is advantageous in so far as a possible longitudinal guidance of the coupling element along the geometrical spindle axis is not loaded by the torques occurring about the geometrical spindle axis.

Also described herein is a method for producing a locking aid drive as described herein.

A substantial aspect for the method according to the proposal is that the coupling element is brought, in particular by means of the drive motor, into a coupling position in which said coupling element is accessible from the outside for the installation of the Bowden cable, as discussed above, and that the Bowden cable is subsequently fitted to the coupling element. This method can readily be carried out within the scope of the manufacturing of the motor vehicle, in particular by the adjustment of the coupling element into the coupling position being possible by means of the drive motor which is already at least provisionally connected. Furthermore, reference should be made to all of the explanations regarding the locking aid drive according to the proposal.

Embodiments described herein include a locking aid drive for a motor vehicle lock, a drive housing being provided, the locking aid drive being coupleable in terms of drive to the motor vehicle lock via a Bowden cable with a Bowden cable core and Bowden cable sheath and a drive motor with a downstream feed mechanism for producing driving movements and a coupling element for transferring the driving movements being provided, wherein the coupling element can be brought, in particular by means of the drive motor, into at least one coupling position in which said coupling element is accessible from the outside for the production of a coupling of the Bowden cable to the coupling element, and otherwise is inaccessible from the outside for the production of a coupling of the Bowden cable to the coupling element.

In an embodiment, the coupling element is adjusted within an operating movement range during a locking aid operation, such as wherein the coupling position lies outside the operating movement range, or wherein the coupling position lies within the operating movement range.

In an embodiment, for the coupling of the Bowden cable, a core end piece of the Bowden cable core can be brought into engagement in a form-fitting manner with the coupling element when the coupling element is in the coupling position, such as wherein the coupling element has a coupling formation for this purpose, such as wherein the coupling formation permits a form-fitting coupling to a Bowden cable drum which has a rotationally symmetrical, in particular round configuration with respect to the longitudinal extent of the Bowden cable.

In an embodiment, the form-fitting connection between coupling element and core end piece acts in the direction of the driving movements, but permits a rotational movement between coupling element and core end piece about the longitudinal extent of the Bowden cable.

In an embodiment, for the coupling of the Bowden cable, a core end piece of the Bowden cable core is insertable into the coupling element with an installation direction substantially transverse with respect to the longitudinal extent of the Bowden cable when the coupling element is in the coupling position.

In an embodiment, the drive housing has an installation channel into which the core end piece of the Bowden cable core is insertable with an installation direction substantially along the longitudinal extent of the Bowden cable, such as wherein the installation channel has a deflecting contour which brings about a deflection of the core end piece transversely with respect to the longitudinal extent of the Bowden cable.

In an embodiment, when the coupling element is in the coupling position, the form-fitting connection between core end piece and coupling element is releasable, and wherein, when the coupling element is in the operating movement range, the release of the form-fitting connection between core end piece and coupling element is blocked, in particular by the drive housing.

In an embodiment, the drive housing has a housing cutout through which the coupling element in the coupling position is accessible from the outside for the coupling of the Bowden cable.

In an embodiment, a covering element is provided which, when the Bowden cable is fitted, covers the entry point of the Bowden cable into the drive housing, and wherein, when the coupling element is in the coupling position, the covering element locks the release of the form-fitting connection between core end piece and coupling element, such as wherein the covering element is configured as a covering bush.

In an embodiment, the covering element provides a seal in relation to the drive housing, on the one hand, and in relation to the Bowden cable sheath, on the other hand, such that the housing cutout is sealed towards the outside.

In an embodiment, the feed mechanism has an output element which is coupled to the coupling element, such as wherein the output element is in engagement in a form-fitting manner with the coupling element.

In an embodiment, the feed mechanism is configured as a spindle/spindle nut mechanism with spindle and spindle nut, such as wherein the spindle nut is coupled to the drive motor such that the spindle provides the output element of the feed mechanism.

In an embodiment, the coupling element is guided in a longitudinally displaceable, but non-rotatable manner along the geometrical spindle axis in the drive housing.

In an embodiment, the spindle is coupled, in particular via a spindle end piece, to the coupling element, such as wherein the spindle is longitudinally displaceable with respect to the geometrical spindle axis, but is non-rotatable in relation to the drive housing, such as wherein the spindle end piece is in engagement with the drive housing non-rotatably with respect to the geometrical spindle axis, or wherein the spindle is in engagement with the coupling element non-rotatably with respect to the geometrical spindle axis and the coupling element is in engagement with the drive housing non-rotatably with respect to the geometrical spindle axis.

An embodiment provides a method for installing a Bowden cable on a locking aid drive as described herein, wherein the coupling element is brought, in particular by means of the drive motor, into a coupling position in which said coupling element is accessible from the outside for the production of a coupling of the Bowden cable to the coupling element, and wherein the Bowden cable is subsequently coupled to the coupling element.

BRIEF DESCRIPTION OF THE FIGURES

The invention is explained in more detail below with reference to drawings that merely illustrate an exemplary embodiment. In the drawings.

DETAILED DESCRIPTION

The locking aid drive 1 according to the proposal is assigned to a motor vehicle lock 2 and serves for transferring the motor vehicle lock 2 from a pre-locking state into a main locking state. As explained above, the term "motor vehicle lock" includes all types of door locks, hood locks, lid locks or flap locks.

Figure 1:
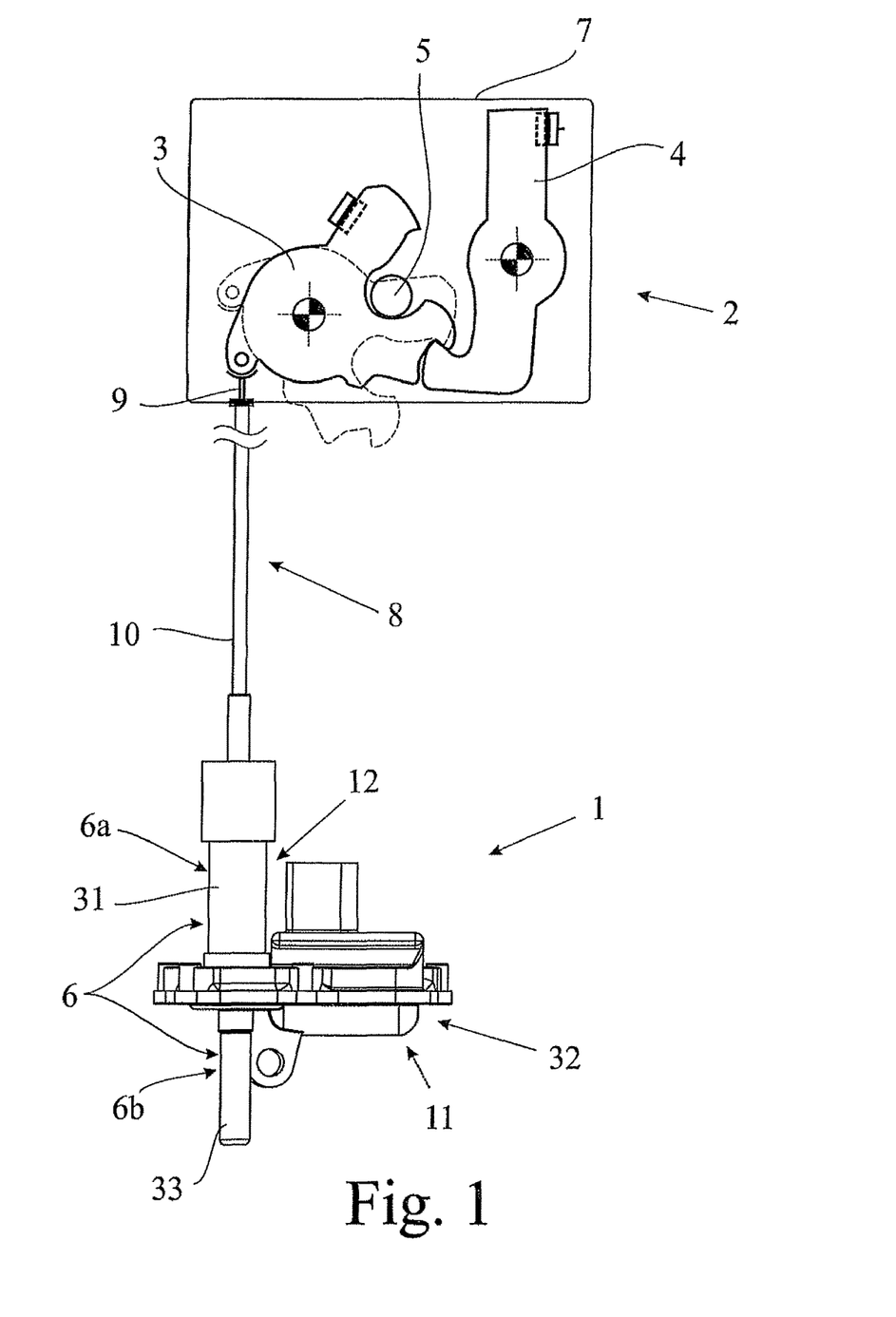
FIG. 1 shows the structural design of a locking aid drive according to the invention and of an associated motor vehicle lock in the fitted state.

FIG. 1 shows the design of the motor vehicle lock 2 with the customary locking elements: lock latch 3 and pawl 4, wherein the lock latch 3 interacts in a likewise customary manner with a locking wedge 5 or the like. Instead of the locking wedge 5, a locking dog, a striker or the like may also be provided.

FIG. 1 furthermore shows that the locking aid drive 1 has a dedicated drive housing 6 which, in the fitted state, is arranged separately from the motor vehicle lock 2. The motor vehicle lock 2 is likewise provided with a housing 7, which is referred to here as lock housing.

In the fitted state, the locking aid drive 1 is coupled in terms of drive to the motor vehicle lock 2 via a Bowden cable 8. The Bowden cable 8 in the customary manner has a Bowden cable core 9 and a Bowden cable sheath 10. A drive motor 11 with a downstream feed mechanism 12 is provided for producing driving movements. The driving movements are primarily movements which bring about an adjustment of the lock latch 3 from the pre-locking position, illustrated by a dashed line in FIG. 1, into the main locking position, illustrated by a solid line, of the lock latch 3. For this purpose, the lock latch 3 can be coupled to the Bowden cable core 9 of the Bowden cable 8, as indicated in FIG. 1.

A coupling element 13 which is adjustable within the drive housing 6 by means of the drive motor 11 is provided for the transfer of the driving movements.

According to the proposal, the coupling element 13 can be brought, here by means of the drive motor 11, into at least one coupling position, here into precisely one coupling position, in which said coupling element is at least partially accessible from the outside for the production of a coupling of the Bowden cable 8 to the coupling element 13 and otherwise is inaccessible from the outside for the production of a corresponding coupling of the Bowden cable 8. The coupling position can be seen by way of example in FIG. 3b.

As indicated above, a plurality of coupling positions permitting corresponding accessibility of the coupling element 13 can be provided. For the purposes of a simple illustration, only a single coupling position is discussed below.

Figure 2:
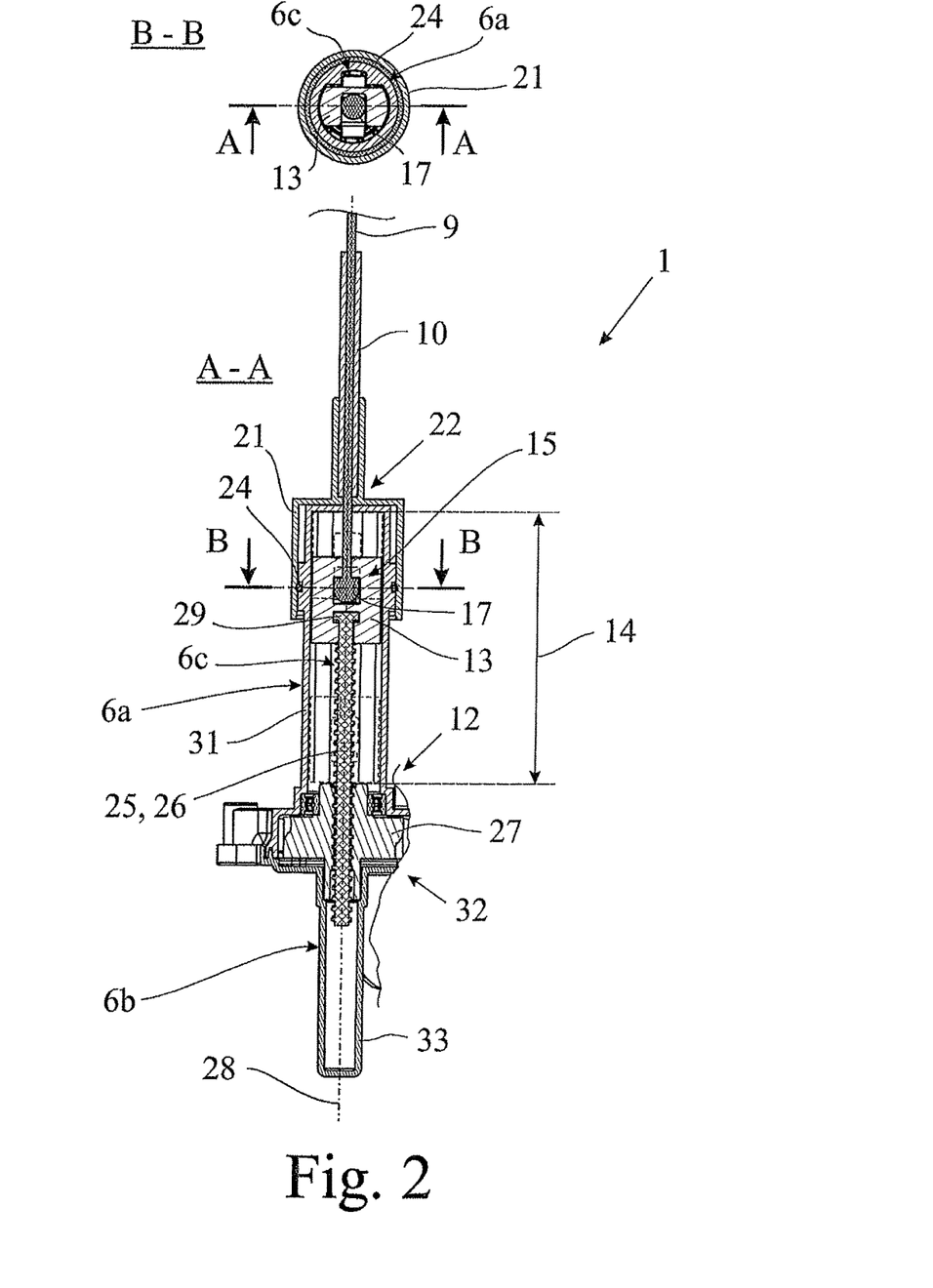
FIG. 2 shows the locking aid drive according to FIG. 1 in a longitudinal section along the intersecting line A-A and in a cross section along the intersecting line B-B, in each case when a coupling element is in the operating movement range.

FIG. 2 shows the starting state of the locking aid drive 1, from which a locking aid operation can be started. By adjustment of the coupling element 13 by means of the drive motor 11, the Bowden cable core 9 can be adjusted relative to the Bowden cable sheath 10 in such a manner that the lock latch 3 is transferred from the pre-locking position into the main locking position. The position of the coupling element 13 at the end of the locking operation is illustrated by a dashed line in FIG. 2. The coupling element 13 is subsequently reset by a reverse activation of the drive motor 11 or by a spring element (not illustrated). As a result, the coupling element 13 is adjusted during a locking aid operation within an operating movement range 14, the extent of which is indicated in FIG. 2.

The starting position, shown in FIG. 2, of the coupling element 13 is additionally shown in the illustration according to FIG. 3a. It is clear here that the coupling position of the coupling element 13 lies outside the operating movement range 14. Alternatively, provision may be made for the coupling position of the coupling element 13 to lie within the operating movement range 14 or at an edge of the operating movement range 14. The first-mentioned alternative, which is illustrated in the drawing, shows a high degree of security against an undesirable removal of the Bowden cable 8, as is also shown.

An overall view of FIGS. 3b and 3c shows that, for the production of a coupling of the Bowden cable 8, a core end piece 15 of the Bowden cable sheath 9 can be brought into engagement in a form-fitting manner with the coupling element 13 when the coupling element 13 is in the coupling position. For this purpose, the coupling element 13 can have a coupling formation 16 which here can be configured in the manner of a trough. The trough-like coupling formation 16 can have an undercut (not illustrated here) which prevents the core end piece 15 from being able, after the insertion, to spring out again from the coupling formation 16 without longitudinal movement, for example because of the elasticity of the Bowden cable 8.

Of interest here is the fact that here the coupling formation 16 permits a form-fitting coupling to a Bowden cable drum 17 which has a rotationally symmetrical, in particular round configuration, with respect to the longitudinal extent of the Bowden cable 8. In principle, however, any shape of a Bowden cable drum 17 can be used.

In an embodiment, the form-fitting connection between coupling element 13 and core end piece 15 acts in the direction of the driving movements, and therefore the driving movements can be transmitted via the form-fitting connection. However, the form-fitting connection permits a rotational movement between coupling element 13 and core end piece 15 about the longitudinal extent of the Bowden cable 8. This is best revealed from an overall view of the cross-sectional illustration according to FIG. 2 and the illustration according to FIG. 3c. In an appropriately play-affected configuration, mechanical torsional stresses can therefore be completely avoided within the Bowden cable core 9.

FIG. 3c shows that the coupling formation 16 in the coupling element 13 additionally comprises a groove-like formation 18 which runs along the longitudinal extent of the Bowden cable 8. The core end piece 15 together with the Bowden cable drum 17 can therefore easily be hooked into the coupling element 13.

In order to obtain the above rotatability between coupling element 13 and core end piece 15, provision can in principle also be made for the coupling formation 16 to be rotationally symmetrical itself with respect to the longitudinal extent of the Bowden cable 8. As indicated above, any type of Bowden cable drum 17 can then be used.

Figure 3:
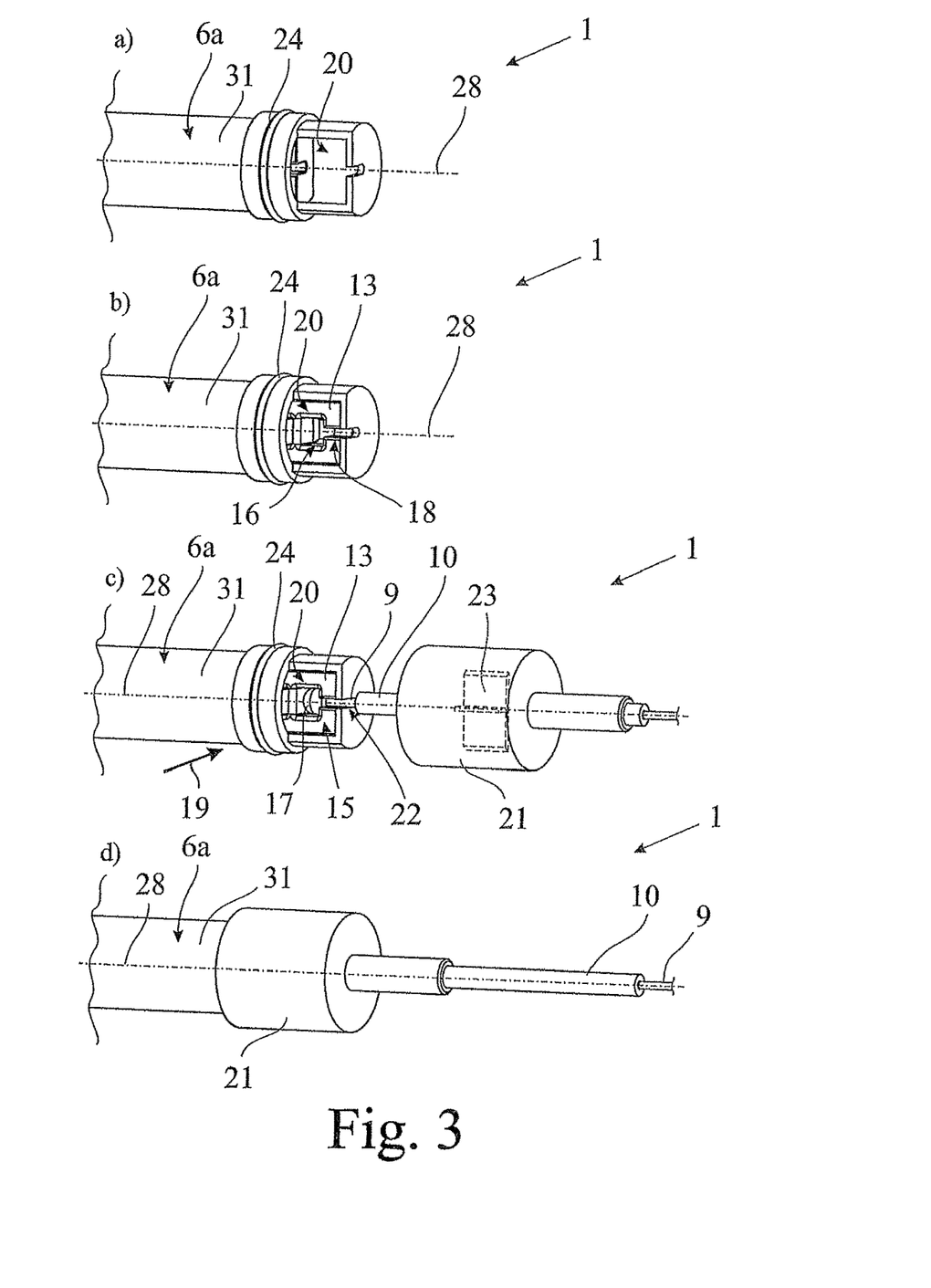
FIG. 3 shows various stations of a method according to the proposal for installing a Bowden cable on the locking aid drive according to FIG. 1 a) when the coupling element is still in the operating movement range, b) when the coupling element is in the coupling position, c) when the Bowden cable is coupled to the coupling element, and d) when the covering element is placed on, and FIG. 4 shows an exploded illustration of the spindle and of the coupling element of the locking aid drive according to FIG. 1 and of the core end piece of the Bowden cable between locking aid drive and motor vehicle lock.
Figure 4:
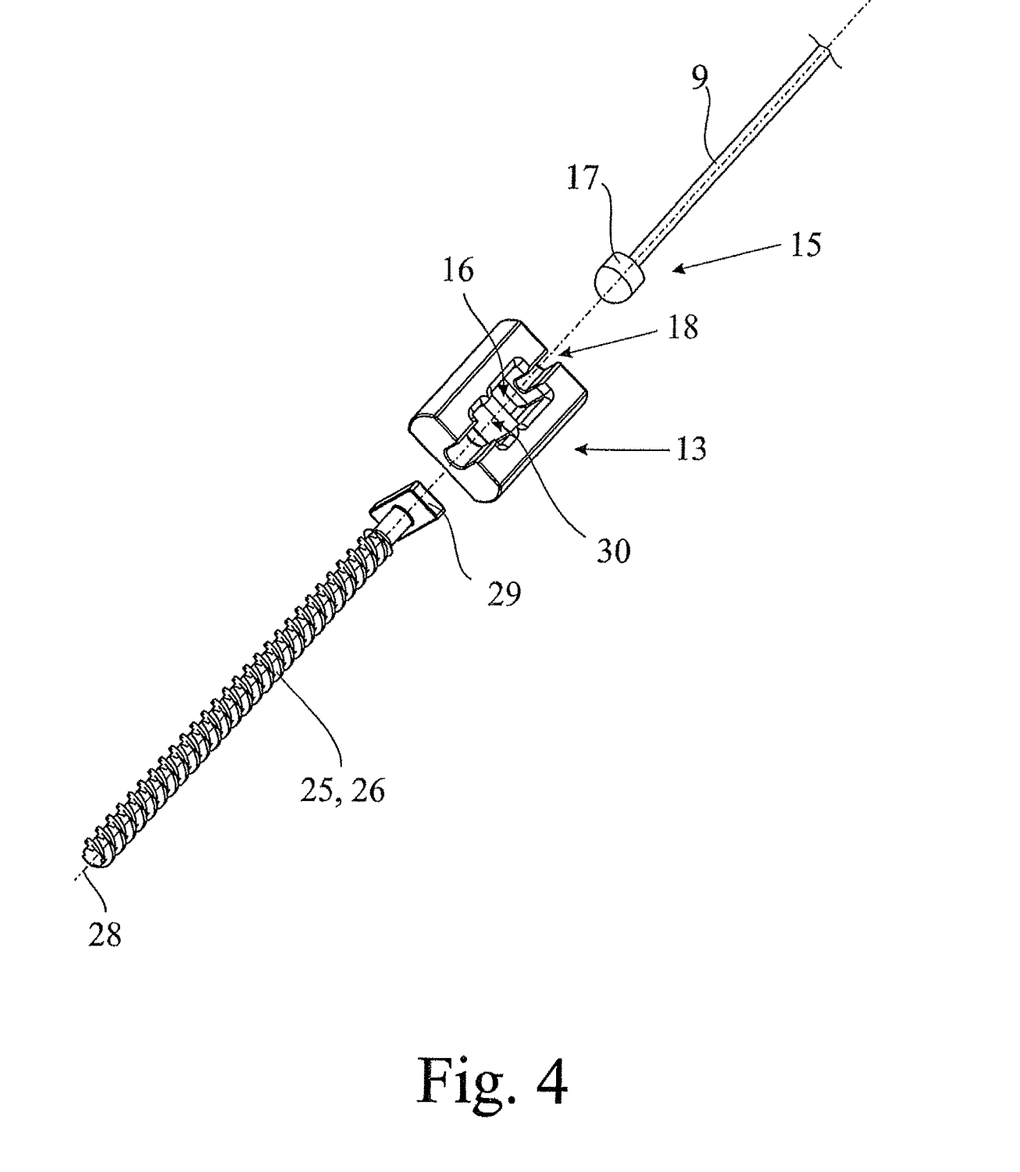

Here, for the coupling of the Bowden cable 8, the core end piece 15 of the Bowden cable core 9 is insertable into the coupling element 13 with an installation direction 19 substantially transverse with respect to the longitudinal extent of the Bowden cable 8 when the coupling element 13 is in the coupling position (FIG. 3b). The hooking in of the core end piece 15 that is shown in FIG. 3 can be realized reliably and with little structural outlay.

By contrast, in another embodiment (not illustrated), the drive housing 6 has an installation channel in which the core end piece 15 of the Bowden cable core 9 of the Bowden cable 8 is insertable with an installation direction substantially along the longitudinal extent of the Bowden cable 8. It is furthermore optionally provided here that the installation channel has a deflecting contour which brings about a deflection of the core end piece 15 transversely with respect to the longitudinal direction of the Bowden cable 8. Specifically, an installation direction running along the longitudinal extent of the Bowden cable 8 is deflected here into an installation direction running transversely with respect to the longitudinal extent of the Bowden cable 8.

FIG. 3c shows that, when the coupling element 13 is in the coupling position, the form-fitting connection between core end piece 15 and coupling element 13 is still releasable. By contrast, when the coupling element 13 is in the operating movement range, the release of the form-fitting connection between core end piece 15 and coupling element 13 is blocked, optionally by the drive housing 6. Any additional fastening elements whatsoever of the Bowden cable drum 17 to the coupling element 13 are therefore superfluous.

In principle, provision may be made for the coupling element 13 in the coupling position to protrude slightly out of the drive housing 6 such that the production of a coupling of the Bowden cable 8 to the coupling element 13 is possible. However, the drive housing 6 optionally has a housing cutout 20 through which the coupling element 13 in the coupling position is accessible from the outside, i.e. from outside the drive housing 6, for the coupling of the Bowden cable 8 to the coupling element 13. The housing cutout 20 can best be gathered from the illustration according to FIG. 3a.

FIG. 3c shows that a covering element 21 is provided which, when the Bowden cable 8 is fitted, covers the entry point 22 of the Bowden cable 8 into the drive housing 6. The covering element 21 can be configured as a covering bush which, in an embodiment, is produced from a plastic or rubber material.

However, the covering element 21 does not only have a covering and/or sealing function, but, when the coupling element 13 is in the coupling position (FIG. 3c), blocks the undesirable release of the form-fitting connection between core end piece 15 and coupling element 13. This is realized by the fact that the covering element 21 has a blocking surface 23 which, when the covering element 21 is placed onto the drive housing 6, is in blocking engagement with the core end piece 15 of the Bowden cable 8 if the coupling element 13 is in the coupling position. The placed-on state of the covering element 21 is shown in FIG. 3d.

As indicated above, the covering element 21 provides a seal in relation to the drive housing 6, on the one hand, and in relation to the Bowden cable sheath 10, on the other hand, such that the housing cutout 20 is sealed toward the outside. For this purpose, at the engagement point with the covering element 21, the drive housing 6 is provided with a seal 24 which here is optionally configured as an encircling O ring.

FIG. 2 shows that the feed mechanism 12 has an output element 25 which is coupled to the coupling element 13. Here, the output element 25 is optionally in engagement, in particular releasably, with the coupling element 13 in a form-fitting manner.

In principle, the feed mechanism 12 can be configured as a mechanism with a rotary output. The output element 25 can be configured as a pivotable actuating lever or the like. Here, however, the feed mechanism 12 has an optional linear output. The output element 25 is correspondingly adjustable exclusively linearly.

Alternatively to the above-discussed form-fitting connection between the output element 25 and the coupling element 13, it can be provided that the coupling element 13 is an integral part of the output element 25.

In principle, the coupling element 13 can be of multi-part configuration. Here, however, the coupling element 13 is optionally configured as a single piece. In a refinement which is particularly simple to manufacture, the coupling element 13 is configured as a single-piece plastics injection molded part.

As indicated above, numerous advantageous variants are conceivable for realizing the feed mechanism 12. FIG. 2 shows that the feed mechanism 12 is configured here as a spindle/spindle nut mechanism with spindle 26 and spindle nut 27. The spindle nut 27 can be coupled here to the drive motor 11, and therefore the spindle 26 provides the output element 25 of the feed mechanism 12. The spindle nut 27 can be a worm wheel which meshes with a worm (not illustrated) on a drive shaft of the drive motor 11. Advantageous configurations for the drive of the spindle nut 27 are conceivable. FIG. 2 shows that the spindle nut 27 is mounted in a rotatable, but axially fixed manner with respect to the geometrical spindle axis 28.

In principle, provision may be made for the coupling element 13 to be guided in a longitudinally displaceable, but non-rotatable manner along the geometrical spindle axis 28 in the drive housing 6. However, here the coupling element 13 itself is optionally not in non-rotatable engagement with the drive housing 6. However, the spindle 26 is coupled to the coupling element 13, in particular via a spindle end piece 29, and can be in engagement with the coupling element 13 non-rotatably with respect to the geometrical spindle axis 28. Furthermore, as illustrated in FIG. 2, it is optionally provided that the spindle 26, in particular the spindle end piece 29, is longitudinally displaceable with respect to the geometrical spindle axis 28, but is non-rotatable in relation to the drive housing 6. For this purpose, the drive housing 6 has a groove-like formation 6c in which the spindle end piece 29, which is at least partially tongue-like here, runs. Owing to the effect that the spindle end piece 29 is in engagement with the drive housing 6 non-rotatably with respect to the geometrical spindle axis 28, the coupling element 13 is, as a result, also arranged non-rotatably in relation to the drive housing 6.

Alternatively thereto, provision may be made for the spindle 26 to be in engagement with the coupling element 13 non-rotatably with respect to the geometrical spindle axis 28 and for the coupling element 13, in turn, to be in engagement with the drive housing 6 non-rotatably with respect to the geometrical spindle axis 28. Other advantageous variants for realizing the non-rotatable arrangement of the spindle 26 in the drive housing 6 are conceivable.

FIG. 2 shows that between the spindle end piece 29 and the coupling element 13 there is a form-fitting connection which originates from an insertion of the spindle end piece 29 with an installation direction transverse with respect to the geometrical spindle axis 28. A further coupling formation 30 is provided in the coupling element 13 for said form-fitting connection.

The coupling element 13 can basically serve as a triggering element for a sensor element (not illustrated). In the simplest case, the sensor element is a microswitch which can be triggered by the coupling element 13. It is particularly advantageous here for the drive housing 6 to have two partial housings 6a, 6b which are joined to each other in the fitted state. The microswitch can be entirely arranged within the drive housing 6. This means that the microswitch is inserted, in particular pushed, into the installation position thereof when the drive housing 6 is open.

Furthermore, the coupling element 13 can be used in order to provide at least one end stop for the driving movements. Provision can be made here for the coupling element 13 to be provided with a corresponding damping arrangement such that the approach of an end stop is correspondingly damped.

The Bowden cable sheath 10 can be arranged on the drive housing 6. Various advantageous variants are conceivable for the coupling of the Bowden cable sheath 10 to the drive housing 6. The Bowden cable sheath 10 can be coupled to the drive housing 6 rotatably with respect to the longitudinal extent of the Bowden cable 8 such that, as discussed above in conjunction with the Bowden cable core 9, any mechanical torsional stress in the Bowden cable 8 is avoided.

Importance is likewise attached here to the structural configuration of the drive housing 6. The drive housing 6 has an elongate portion 31 which receives the coupling element 13 and at the end of which the above-discussed housing cutout 20 is arranged. The elongate portion 31 is part of the housing part 6a which here can be configured as a single piece. The drive housing 6 furthermore has a cover-like portion 32 which likewise has an elongate portion 33 for receiving the spindle 26. The cover-like portion 32 is provided by the second housing part 6b which here can be likewise configured as a single piece. The two housing parts 6a, 6b are joined and clipped, screwed, adhesively bonded or cast to or on each other in an installation movement which runs substantially along the geometrical spindle axis 28.

In addition, an embodiment of a method for installing the Bowden cable 8 on the locking aid drive 1 as described herein is disclosed.

A substantial aspect according to the method according to the proposal is that the coupling element 13 is brought, optionally in this case by means of the drive motor 11, into a coupling position (FIG. 3b) in which said coupling element is accessible from the outside for the production of a coupling of the Bowden cable 8 to the coupling element 13, wherein the Bowden cable 8 is subsequently coupled to the coupling element 13. The adjustment of the coupling element 13 into the coupling position can be preceded by installation of the locking aid drive 1 and/or of the motor vehicle lock 2 in or on the associated motor vehicle door. Said preceding installation operation can be associated with an electrical connection of the drive motor 11, and therefore the coupling element 13 can readily be adjusted into the coupling position by motor.

It should also be pointed out, in conjunction with the method according to the proposal, that the installation direction for the coupling of the Bowden cable 8 to the coupling element 13 can take place transversely with respect to the longitudinal extent of the Bowden cable 8, as explained above. To this extent and with respect to possible alternatives to said installation direction, reference should be made to the above explanations regarding the locking aid drive 1 according to the proposal.

What is claimed is:

1. A locking aid drive for a motor vehicle lock, comprising:
   a drive housing, the locking aid drive being coupleable to the motor vehicle lock via a Bowden cable with a Bowden cable core and Bowden cable sheath and a drive motor with a downstream feed mechanism for producing driving movements; and
   a coupling element for transferring the driving movements,
   wherein the coupling element is moveable relative to the drive housing into at least one coupling position and at least one non-coupling position,
   wherein in the at least one coupling position the coupling element is accessible from an outside of the drive housing, such that a coupling of the Bowden cable to the coupling element is exposed, and
   wherein in the at least one non-coupling position the coupling element is inaccessible from the outside of the drive housing, such that the coupling of the Bowden cable to the coupling element is not exposed.

2. The locking aid drive as claimed in claim 1, wherein the coupling element is adjusted within an operating movement range during a locking aid operation.

3. The locking aid drive as claimed in claim 2, wherein the coupling position lies outside the operating movement range.

4. The locking aid drive as claimed in claim 2, wherein, for the coupling of the Bowden cable, a core end piece of the Bowden cable core can be brought into engagement in a form-fitting manner with the coupling element when the coupling element is in the at least one coupling position.

5. The locking aid drive as claimed in claim 4, wherein the form-fitting manner of engagement between the coupling element and the core end piece restricts movement in a direction of the driving movements between the coupling element and the core end piece, but permits a rotational movement between the coupling element and the core end piece about a longitudinal extent of the Bowden cable.

6. The locking aid drive as claimed in claim 4, wherein, when the coupling element is in the at least one coupling position, the form-fitting manner of engagement between the core end piece and the coupling element is releasable, and wherein, when the coupling element is in the operating movement range, the release of the form-fitting connection between the core end piece and the coupling element is blocked by the drive housing.

7. The locking aid drive as claimed in claim 4, wherein a covering element is provided which, when the Bowden cable is fitted, covers an entry point of the Bowden cable into the drive housing, and wherein, when the coupling element is in the at least one coupling position, the covering element locks the release of the form-fitting manner of engagement between the core end piece and the coupling element.

8. The locking aid drive as claimed in claim 7, wherein the covering element provides a seal in relation to the drive housing and in relation to the Bowden cable sheath, such that a housing cutout is sealed towards the outside.

9. The locking aid drive as claimed in claim 7, wherein the covering element comprises a covering bush.

10. The locking aid drive as claimed in claim 4, wherein the coupling element has a coupling formation.

11. The locking aid drive as claimed in claim 10, wherein the coupling formation permits a form-fitting coupling to a Bowden cable drum which has a rotationally symmetrical configuration with respect to a longitudinal extent of the Bowden cable.

12. The locking aid drive as claimed in claim 1, wherein the downstream feed mechanism is configured as a spindle/spindle nut mechanism with a spindle and a spindle nut.

13. The locking aid drive as claimed in claim 12, wherein the spindle is coupled to the coupling element.

14. The locking aid drive as claimed in claim 1, wherein, for the coupling of the Bowden cable, a core end piece of the Bowden cable core is insertable into the coupling element with an installation direction transverse with respect to a longitudinal extent of the Bowden cable when the coupling element is in the at least one coupling position.

15. The locking aid drive as claimed in claim 1, wherein the drive housing has a housing cutout through which the coupling element in the at least one coupling position is accessible from the outside for the coupling of the Bowden cable.

16. The locking aid drive as claimed in claim 1, wherein the downstream feed mechanism has an output element which is coupled to the coupling element.

17. The locking aid drive as claimed in claim 1, wherein the coupling element is guided in a longitudinally displaceable, but non-rotatable manner along a geometrical spindle axis in the drive housing.

18. A method for installing the Bowden cable on the locking aid drive as claimed in claim 1, the method comprising:
   bringing the coupling element into the at least one coupling position, and
   coupling the Bowden cable to the coupling element.

* * * * *